(No Model.)
W. H. WHITMORE & G. H. PRATT.
APPARATUS FOR MANUFACTURING SODIUM HYPOSULPHITE.
No. 253,143. Patented Jan. 31, 1882.
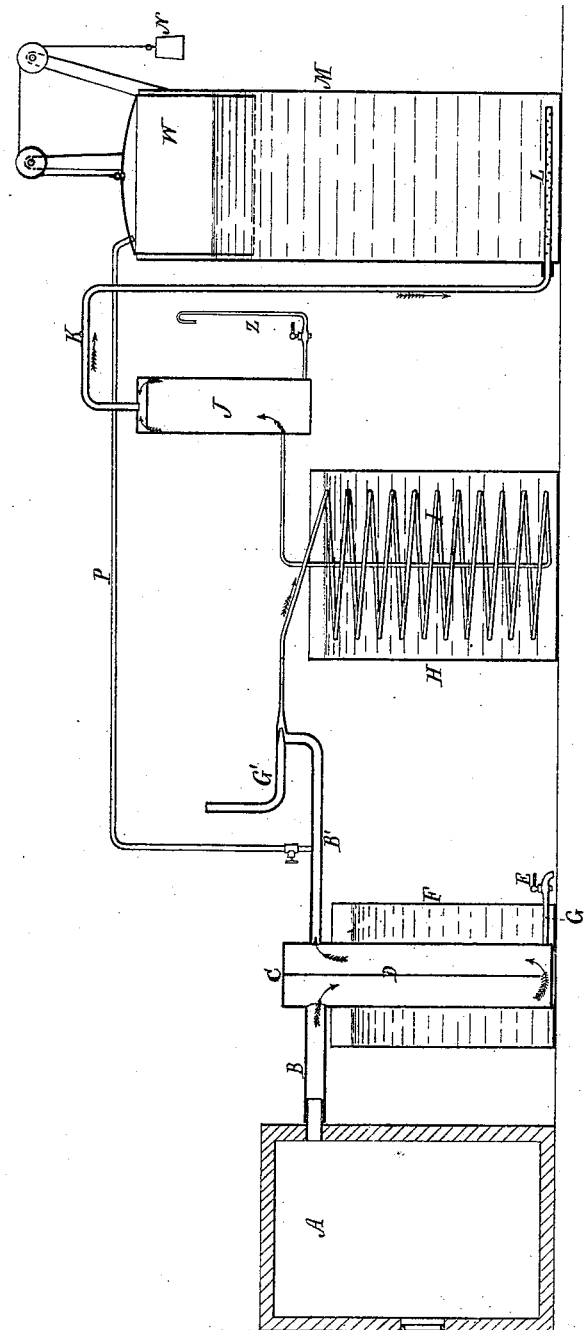
Witnesses
S. N. Piper
E. A. Pratt
Inventors,
Wm. H. Whitmore,
Geo. H. Pratt.
by R. H. Eddy atty

United States Patent Office.

WILLIAM H. WHITMORE AND GEORGE H. PRATT, OF BOSTON, MASSACHU-SETTS, ASSIGNORS TO SAID WHITMORE.

APPARATUS FOR MANUFACTURING SODIUM HYPOSULPHITE.

SPECIFICATION forming part of Letters Patent No. 253,143, dated January 31, 1882.

Application filed October 21, 1881. (No model.)

*To all whom it may concern:*

Be it known that we, WILLIAM H. WHITMORE and GEORGE H. PRATT, of Boston, of the county of Suffolk and State of Massachusetts, have invented a new and useful Improvement in Apparatus or Means for the Manufacture of Hyposulphite of Soda; and we do hereby declare the same to be described in the following specification and represented in the accompanying drawing, which is a longitudinal section of apparatus used in effecting our process of manufacture, or saturating a chemical solution with sulphurous-acid gas.

The nature of our invention is defined by the claims hereinafter presented.

In the said drawing, A denotes a retort or suitable vessel for burning brimstone or pyrites containing sulphur. From such vessel A a pipe, B, leads into the upper part of a closed vessel, C, extending into a tank, F, and provided with a partition, D, such partition reaching from the top nearly to the bottom of the said vessel C, the tank F being charged with water. A pipe, G, having a stop-cock, E, leads out of the lower part of the vessel C, such pipe being for the removal from the vessel C of any sulphuric acid that may be condensed therein. A conduit, B', leads from the vessel C to a steam-jet, G', which may be supposed to be connected with a suitable steam-generator. Steam on passing under pressure through the jet draws the sulphurous-acid gas from the vessel C, and, mixing with it, forces it into and through a worm, I, in a tank, H, the said tank being charged with water. The said worm communicates with a gas and water separator, J, from which a pipe, K, leads down into a vessel, M, and into a rose or foraminous pipe, L, all being as represented, the vessel M being charged with a solution of soda which it may be desired to saturate with the gas.

The vessel J may be provided with a drip-pipe, Z, for draining off the acidulated water.

To the tank M there is a gasometer bell or cover, W, supported by a counter-weight, N. From this bell a pipe, P, leads to the pipe B', whereby any sulphurous-acid gas that may accumulate within the bell may be drawn therefrom by the steam of the jet G' and utilized.

With this apparatus the gas produced in the retort or oven, after being drawn by the steam of the jet into and through the vessel C, and being cooled thereby, is forced with and by the steam into and through the worm, and after being there further cooled, is forced by and passes with the steam into and through the vessel J, and thence through the pipe K into the solution within the tank M.

What we claim as our invention is as follows:

1. For the manufacture of hyposulphite of soda by forcing sulphurous-acid gas through a solution of sulphide of soda, an apparatus or combination, substantially as described, consisting of an oven or retort, A, one or more coolers, C F or H I, the steam-jet G', the gas and water separator J, the conduit K, and tank M, all being connected and to operate essentially as set forth.

2. The combination of the gasometer-bell W and the conduit P with the oven or retort A, the pipe B', steam-jet G', one or more coolers, C F H I, the separator J, pipe K, and tank M, all being adapted essentially in manner and to operate as set forth.

WILLIAM H. WHITMORE.
GEORGE H. PRATT.

Witnesses:
R. H. EDDY,
E. B. PRATT.